(12) United States Patent
Lopez

(10) Patent No.: US 10,486,300 B2
(45) Date of Patent: Nov. 26, 2019

(54) TOOL HOLDER

(71) Applicant: Luis Lopez, Tampa, FL (US)

(72) Inventor: Luis Lopez, Tampa, FL (US)

(*) Notice: Subject to any disclaimer, the term of this patent is extended or adjusted under 35 U.S.C. 154(b) by 0 days.

(21) Appl. No.: 15/823,800

(22) Filed: Nov. 28, 2017

(65) Prior Publication Data
US 2019/0160648 A1  May 30, 2019

(51) Int. Cl.
B25H 3/00 (2006.01)
B25H 3/04 (2006.01)
F16B 1/00 (2006.01)

(52) U.S. Cl.
CPC .............. B25H 3/003 (2013.01); B25H 3/04 (2013.01); F16B 2001/0035 (2013.01)

(58) Field of Classification Search
CPC ... B25H 3/003; B25H 3/04; F16B 2001/0035; H01F 7/02; H01F 7/0215; H01F 7/0252; Y10S 206/818
See application file for complete search history.

(56) References Cited

U.S. PATENT DOCUMENTS

| 2,988,315 | A | * | 6/1961 | Saxe | F16B 5/126 |
| | | | | | 211/106.01 |
| 3,419,832 | A | * | 12/1968 | Baermann | B25H 3/04 |
| | | | | | 206/818 |
| 3,827,021 | A | * | 7/1974 | Phelon | A47J 47/16 |
| | | | | | 248/309.4 |
| 4,497,412 | A | * | 2/1985 | Labelle | A47G 21/14 |
| | | | | | 206/350 |
| 4,591,817 | A | * | 5/1986 | Miller | H01F 7/0215 |
| | | | | | 335/285 |
| 4,621,738 | A | * | 11/1986 | DeLucchi | B25H 3/003 |
| | | | | | 206/378 |
| 6,006,906 | A | * | 12/1999 | Winnard | B25H 3/06 |
| | | | | | 206/350 |
| 6,614,337 | B1 | * | 9/2003 | Winnard | B25B 11/002 |
| | | | | | 206/350 |
| 6,719,155 | B1 | * | 4/2004 | Chang | B25H 3/04 |
| | | | | | 206/350 |
| 7,621,394 | B2 | * | 11/2009 | McCambridge | B65D 25/107 |
| | | | | | 206/350 |
| 7,905,354 | B1 | * | 3/2011 | Geibel | B25H 3/06 |
| | | | | | 206/350 |
| 7,967,268 | B2 | * | 6/2011 | Herron, III | A47B 57/42 |
| | | | | | 108/106 |
| 7,971,736 | B1 | * | 7/2011 | Stewart | B25H 3/04 |
| | | | | | 211/70.7 |
| 8,336,709 | B1 | * | 12/2012 | Geibel | B25H 3/06 |
| | | | | | 206/350 |
| 9,560,923 | B1 | * | 2/2017 | Winnard | A47F 5/0823 |
| 10,166,670 | B2 | * | 1/2019 | Larsson | A45F 5/021 |
| 2018/0200877 | A1 | * | 7/2018 | Su | B25H 3/04 |
| 2018/0311810 | A1 | * | 11/2018 | Larsson | A45F 5/021 |
| 2018/0325247 | A1 | * | 11/2018 | Vlassis | A45F 5/02 |

* cited by examiner

Primary Examiner — Ko H Chan

(57) ABSTRACT

A device includes a body portion including: a top portion, a bottom portion, a first track, a ledge connected to the bottom portion and multiple through-holes. A first magnet element is disposed within the first track.

20 Claims, 9 Drawing Sheets

TOOL HOLDER

BACKGROUND

Mechanics and people that work with tools desire to organize their tools by placing the tools in particular places, such as tool boxes, work benches, peg boards and tool holders. Conventional magnetic tool holders, such as a tool holder with ferrite magnets, are easy to deploy in workshops and garages and hold small tools and accessories (e.g., sockets). The conventional magnetic tool holders, however, are not suited for use in moving trucks and vehicles due to the forces in accelerating, turning and stopping.

SUMMARY

Embodiments relate to tool holders One embodiment is an apparatus that includes a body portion including: a top portion, a bottom portion, a first track, a ledge connected to the bottom portion and multiple through-holes. A first magnet element is disposed within the first track.

These and other features, aspects and advantages of the present invention will become understood with reference to the following description, appended claims and accompanying figures.

DETAILED DESCRIPTION

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
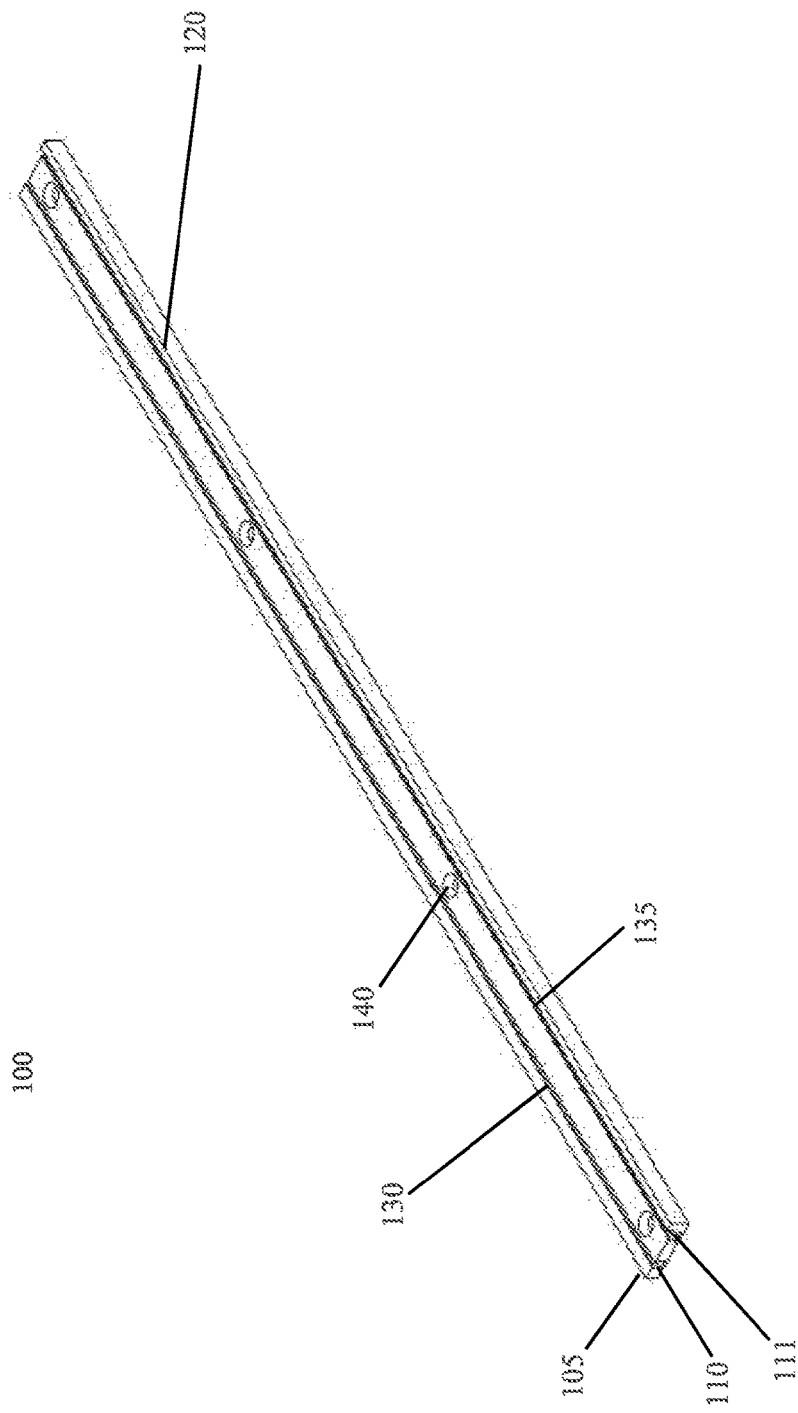
FIG. 1 shows a magnetic tool holder, according to an embodiment.

FIG. 1 shows a magnetic tool holder 100, according to an embodiment. In one embodiment, the magnetic tool holder 100 includes a housing/body portion 105, a first track (or channel) 110, a second track (or channel) 111, a ledge 120, a first magnet element 130, a second magnet element 135 and multiple through-holes 140. In one embodiment, the magnetic tool holder is made of a metal, metal alloy, hardened plastic, wood, etc. In one embodiment, more or less tracks 110/111 may be similarly arranged on the housing portion 105, such as a single channel, three channels, four channels, etc.

In one embodiment, the tracks 110/111 include an opening with a lower portion and an upper portion, where the lower portion has a length greater than a length of the upper portion (e.g., similar to a trapezoidal structure). This structure of the tracks 110/111 provides for retaining the magnetic elements 130/135 from exiting the tracks 110/111 from the top of the housing portion 105. In one embodiment, the magnetic elements 130/135 may be inserted into the tracks 110/111 from a side of the housing portion 105 as the opening of the tracks 110/111 is greater than the circumference or shape of the magnetic elements 130/135. The magnetic elements 130/135 are retained within the tracks as the width or circumference of the magnetic elements 130/135 are greater than the opening of the upper portion of the tracks 110/111 (i.e., the magnetic elements 130/135 cannot pass through the upper portion of the tracks 110/111). In one embodiment, when the housing portion 105 is made of steel, the magnetic elements 130/135 are retained within the tracks 110/111 through magnetic force, which prevents the magnetic elements 130/135 from exiting the side openings of the tracks 110/111. In other embodiments, the magnetic elements 130/135 may be retained within the tracks 110/111 via press fit, bending of the housing 105 material around the magnetic elements 130/135, placement caps or plugs, fasteners, adhesive, friction, etc.

In one embodiment, the magnetic elements 130/135 are rare earth magnets made from alloys of rare-earth elements (i.e., elements in the lanthanide series, plus scandium and yttrium), such a Neodymium magnets and samarium-cobalt magnets. In one embodiment, each of the magnetic elements 130/135 have a length equal to or substantially equal to the length of the housing portion 105. In one example, the magnet elements 130/135 are shaped either square or cylindrical. In one embodiment, the magnet elements 130/135 are each made of one solid/contiguous rare earth element or strip. In another embodiment, the magnet elements 130/135 may be made of several magnetic elements.

In one embodiment, the ledge 120 is located on the bottom portion of the housing portion 105 and supports larger tools/accessories from sliding off the housing portion 105 when a force is applied that is greater than the attractive force of the magnetic elements 130/135 to a tool or accessory. In one example, when the magnetic tool holder 100 is used in a vehicle and the vehicle movement or stoppage causes forces (e.g., from momentum, etc.) applied to the fixed magnetic tool holder 100 that are transferred to the attached tool/accessory on the magnetic tool holder. That is, the tool or accessory wants to continue the motion that the vehicle was experiencing before an acceleration/deacceleration occurs. Additionally, when a vehicle travels over rough roads, hits a bump, etc., a tool/accessory may want to move in a downward motion, sliding down the magnetic tool holder 100. The ledge 120 blocks that movement by adding support of a tool/accessory, which helps with the magnet elements 130/135 maintain the attractive force with the tool/accessory.

In one embodiment, the through-holes 140 may be equally distant on the housing portion 105. In one example, the magnetic tool holder 100 may include four or more through-holes 140. In another example, the magnetic tool holder 100 may include less than four through-holes 140, such as two or three through-holes 140. In one embodiment, the through-holes 140 are designed to hold a fastener (e.g., a screw) such that the head of the fastener is contained within the through-hole 140 opening, making the fastener head flush or below the top of the housing portion 105. In one embodiment, the through-holes 140 are disposed between the tracks 110/111, and sized accordingly. In another embodiment, when the magnetic tool holder 100 is of a larger design, the through-holes 140 may be disposed above and below the tracks 110/111.

Figure 2:
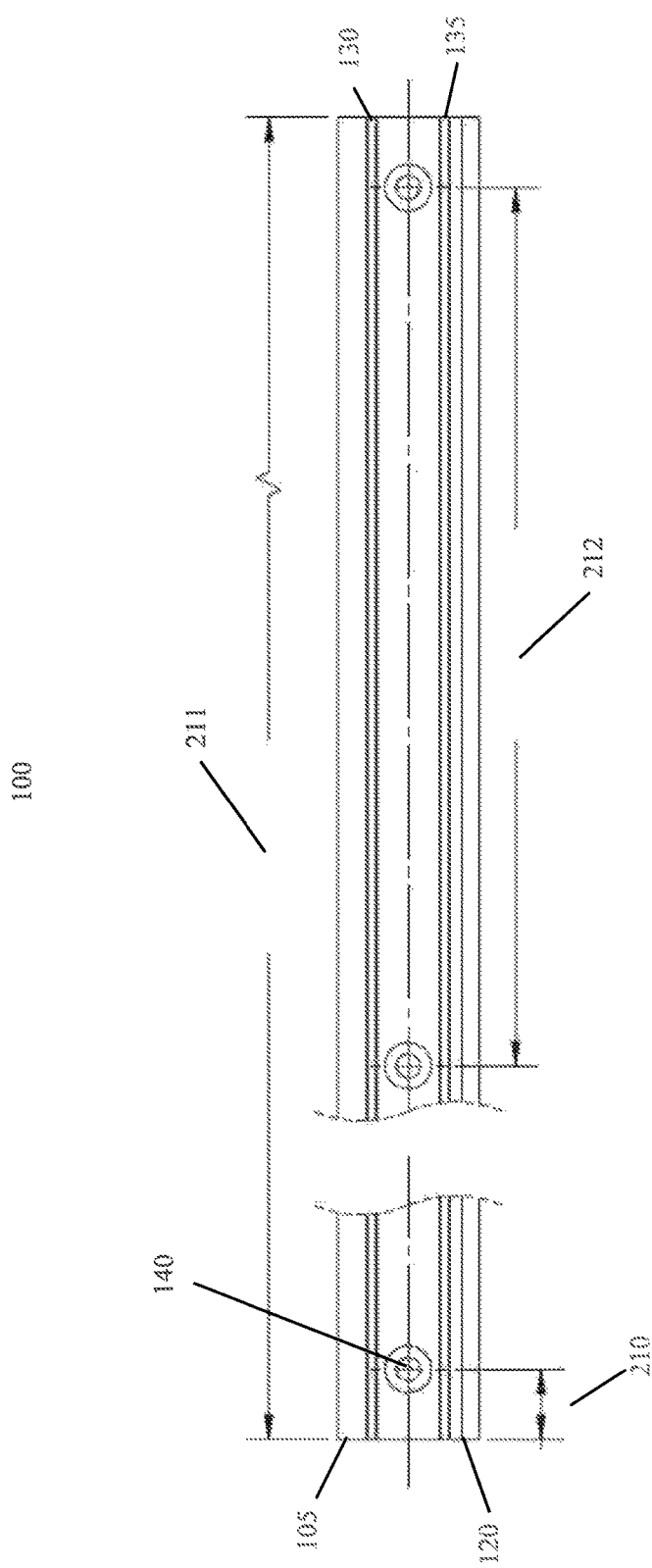
FIG. 2 shows a front view of the magnetic tool holder of FIG. 1, according to an embodiment.

FIG. 2 shows a front view of the magnetic tool holder 100 of FIG. 1, according to an embodiment. In one embodiment, the distance 210 between the front end of the housing portion 105 and the far-left through-hole 140 is approximately 0.5 inches. In one embodiment, the distance 211 between the front end of the housing portion 140 and the back end of the housing portion 140 is approximately 20 inches. In one embodiment, the distance 212 from the next to last through-hole 140 and the last through-hole 140 is approximately 6.25 inches. In other embodiments, the distances 210, 211 and 212 may range above or below the aforementioned lengths. For example, distance 210 may range from 0.25 to 2.5 inches, distance 211 may range from 12-36 inches, and distance 212 may range between 4 to 8.5 inches. In other embodiments, depending on the desired size of the magnetic tool holder 100, the distances 210, 211 and 212 may be adjusted up or down accordingly.

Figure 3A:
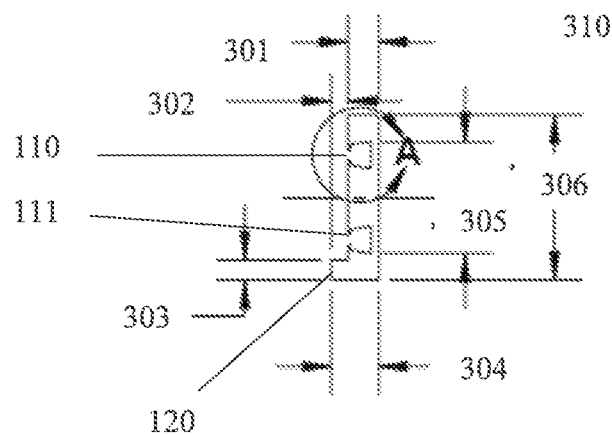
FIG. 3A shows a side view of the magnetic tool holder of FIG. 1, according to an embodiment.

FIG. 3A shows a side view 310 of the magnetic tool holder 100 of FIG. 1, according to an embodiment. In one embodiment, the distance 301 may be 0.186 inches. The distance 302 may be 0.100 inches. The distance 303 may be 0.120 inches. The distance 304 may be 0.286 inches. The distance 305 may be 0.681 inches. The distance 306 may be 1.00 inches. In other embodiments, the distances 301-306 may be other sizes, have a range of size, etc. depending on the desired overall size of the magnetic tool holder 100, design preferences, etc.

Figure 3B:
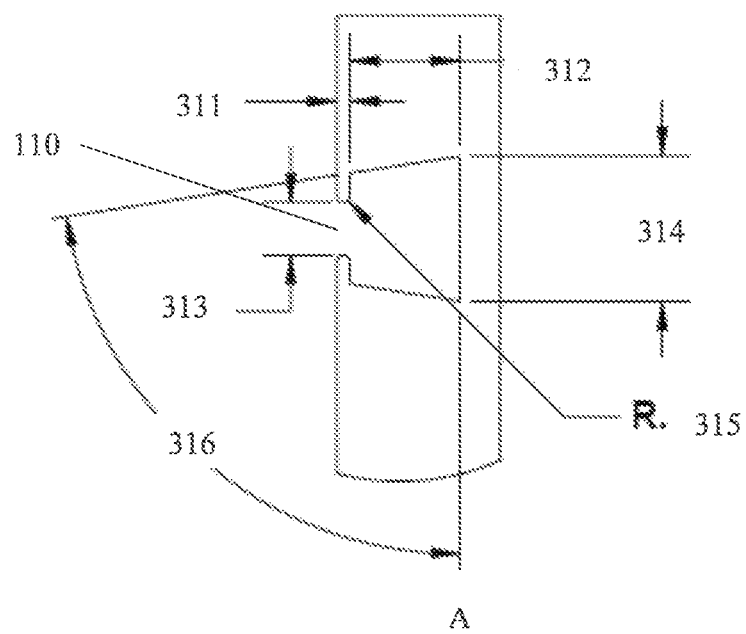
FIG. 3B shows an isolated side view of the area A from FIG. 3A, according to an embodiment.

FIG. 3B shows an isolated side view of the area A from FIG. 3A (e.g., track 110 of the magnetic tool holder 100 of FIG. 1), according to an embodiment. In one embodiment, the distance 311 may be 0.015 inches. The distance 312 may be 0.125 inches. The distance 313 may be 0.060 inches. The distance 314 may be 0.165 inches. The radius (R) 315 may be 0.007 inches. The angle 316 may be 81 degrees. In other embodiments, the distances 311-314, the radius 315 and the angle 316 may be other sizes/angle, have a range of size/angle, etc. depending on the desired overall size of the magnetic tool holder 100, design preferences, etc.

Figure 4:
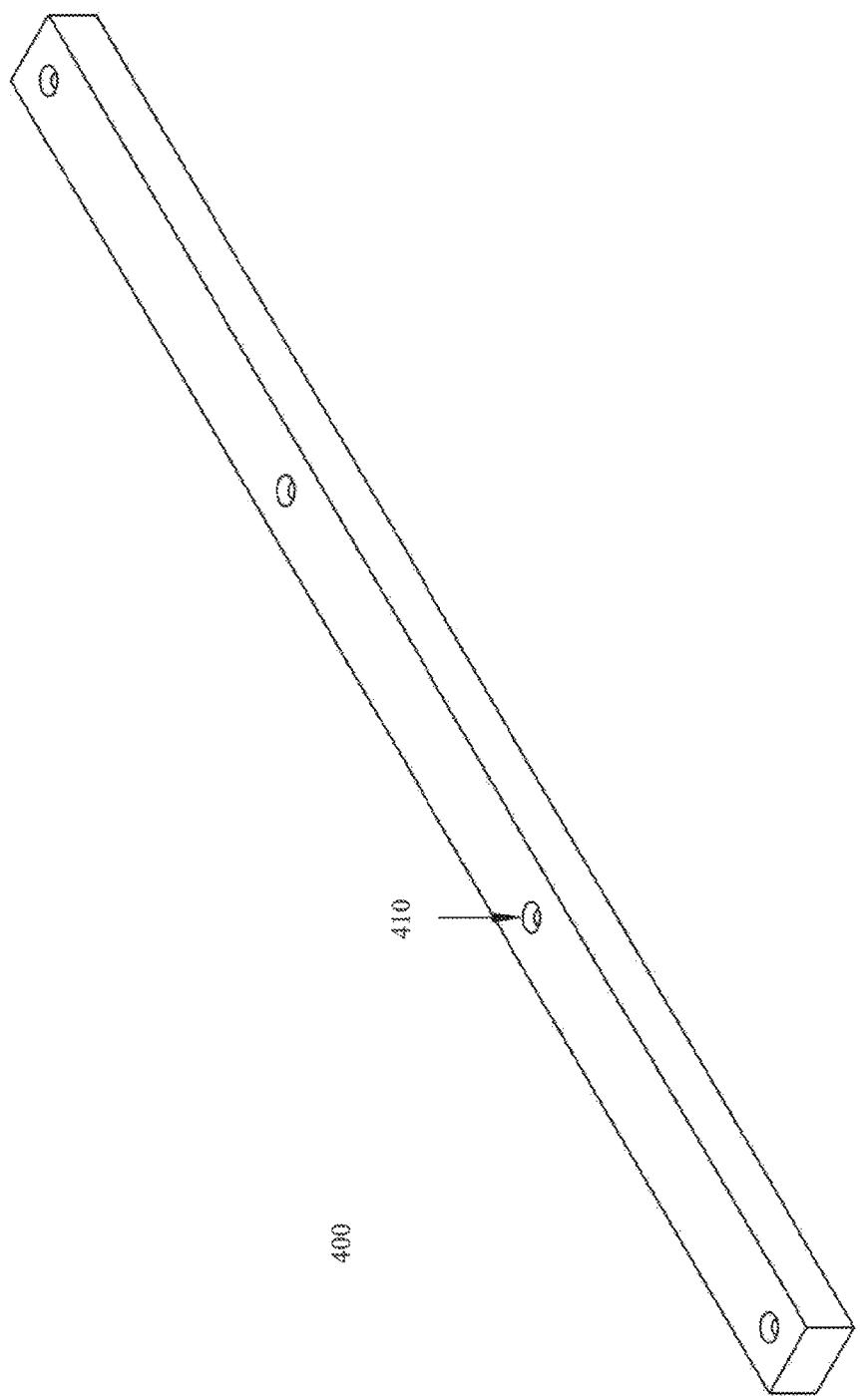
FIG. 4 shows a spacer element, according to an embodiment.

FIG. 4 shows a spacer element 400, according to an embodiment. In one embodiment, the spacer bar 400 is sized accordingly to the magnetic tool holder 100 (FIG. 1), with through-holes 410 that may line up with through-holes 140 (FIG. 1). In one embodiment, the spacer element 400 provides an additional space between the magnetic tool holder 100 and a mounting surface. The additional space provides for larger tools, tool handles, etc. that would otherwise interfere with magnetically coupling a metal tool to the surface of the magnetic tool holder 100. In one embodiment, the spacer element 400 has a rectangular shape. In other embodiments, other shapes may be employed for the spacer element 400, such as polygonal, square, etc.

In one embodiment, the spacer element 400 may be made of a metal, a metal alloy, hardened plastic, fiberglass, wood, etc.

Figure 5A:
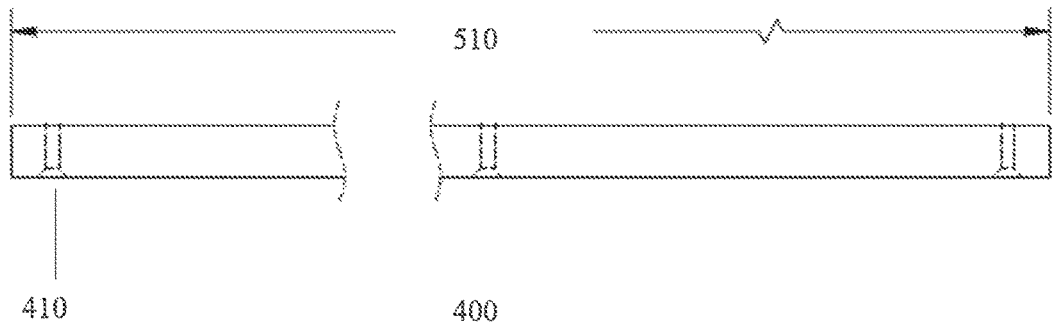
FIG. 5A shows a side view of the spacer element of FIG. 4, according to an embodiment.

FIG. 5A shows a side view of the spacer element 400 of FIG. 4, according to an embodiment. In one embodiment, the distance 510 is 20 inches. In one embodiment, the distance 510 corresponds to the distance 211 (FIG. 2). In other embodiments, distance 510 may be longer or shorter than distance 211, depending on the desired design, shape of tools selected for attachment to the magnetic tool holder 100 (FIG. 1), etc.

Figure 5B:
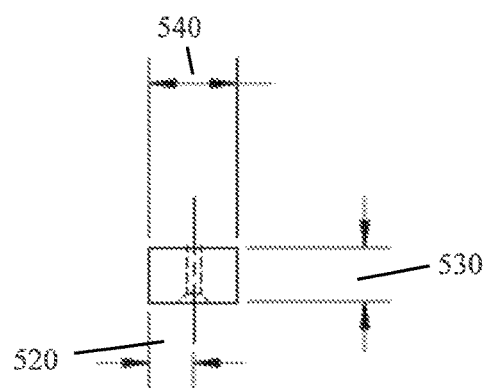
FIG. 5B shows an isolated side view of the spacer element of FIG. 4, according to an embodiment.

FIG. 5B shows an isolated side view of the spacer element 400 with through-holes 410, according to an embodiment. In one embodiment, the distance 520 is 0.50 inches. The distance 530 is 0.625 inches. The distance 540 is 1.0 inches. In other embodiments, the distances 520-540 may be other sizes, have a range of size, etc. depending on the desired overall size of the magnetic tool holder 100 (FIG. 1), design preferences, etc.

Figure 6:
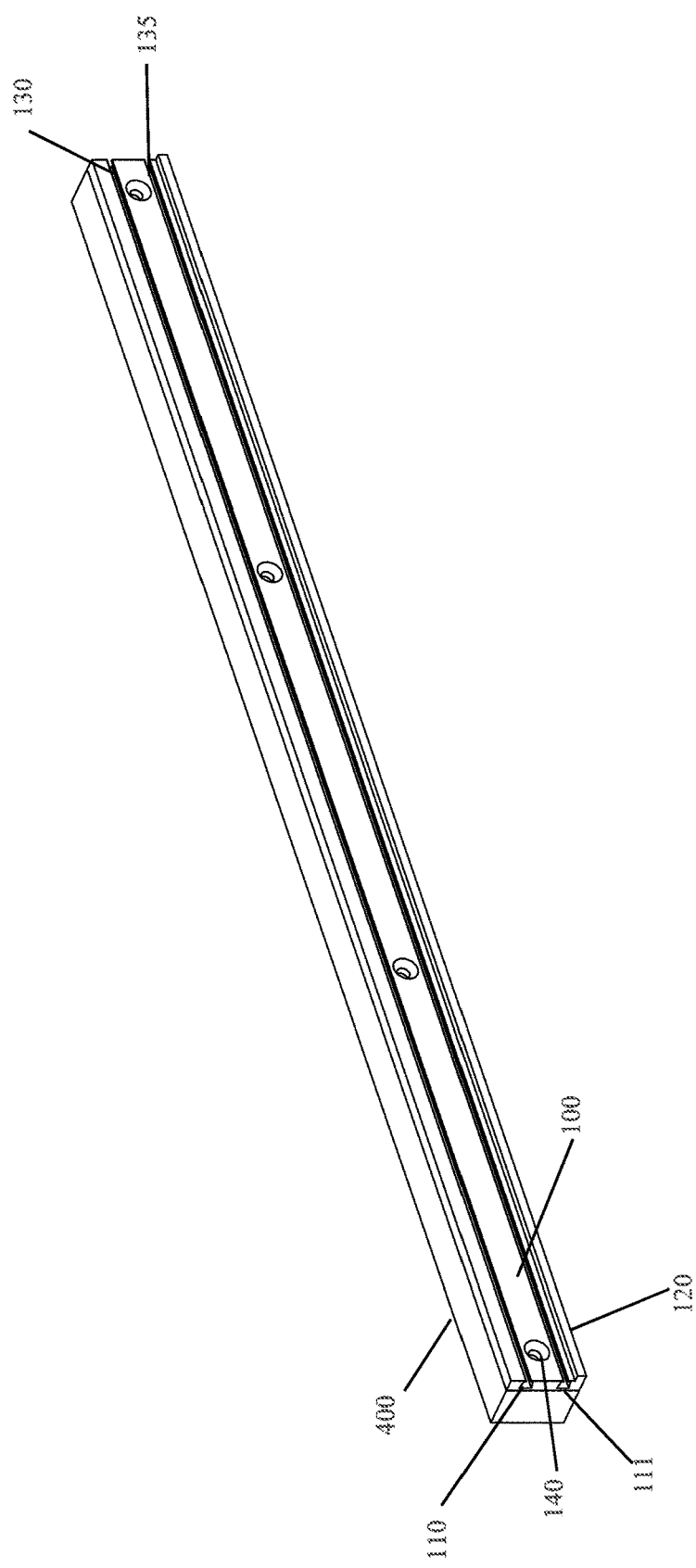
FIG. 6 shows a view of the magnetic tool holder of FIG. 1 coupled with the spacer element of FIG. 4, according to an embodiment.

FIG. 6 shows a view of the magnetic tool holder 100 (FIG. 1) coupled with the spacer element 400 (FIG. 4), according to an embodiment. As shown, the spacer element 400 is sized to match up with the magnetic tool holder 100 and provides an additional distance from a surface that the magnetic tool holder 100 is mounted to by the distance 530 (FIG. 5B). In other examples, additional or different sized spacer elements 400 may be connected to the magnetic tool holder 100 to provide spacing from a surface that the magnetic tool holder is desired to be mounted to.

Figure 7:
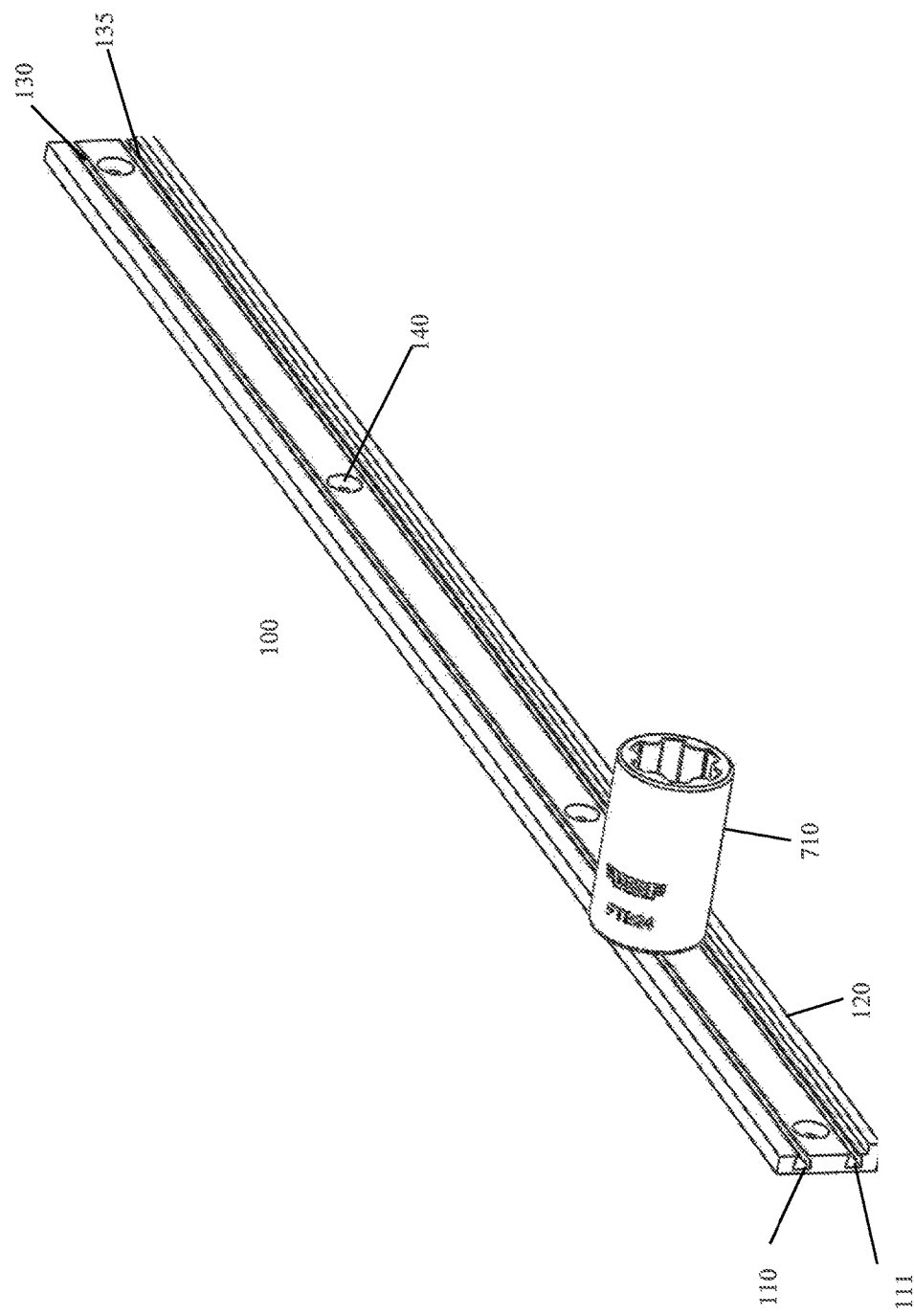
FIG. 7 shows the magnetic tool holder of FIG. 1 holding an example socket, according to an embodiment.

FIG. 7 shows the magnetic tool holder 100 holding an example socket 710, according to an embodiment. In one embodiment, the ledge 120 provides for a support for holding the socket 710 in addition to the first magnet element 130 and the second magnet element 135. In one example, in the case where the magnetic tool holder 100 is mounted in a vehicle, driving over a rough or bumpy road can provide an applied force to the example socket 710 that would normally cause the example socket 710 to slide downward on the first magnet element 130 and the second magnet element 135. The ledge 120, however, prevents the example socket 710 from sliding down the first magnet element 130 and the second magnet element 135 by preventing such sliding movement. In another example, the ledge 120 acts as a placement target for the socket 710 for placement of the socket 710 on the magnetic tool holder 100. That is, the socket 710 may be placed onto the ledge 120 where both the first magnet element 130 and the second magnet element 135 would be in contact with the socket 710, which prevents incorrect placement of the socket 710, for example, only touching the first magnet element 130 but not the second magnet element 135.

Figure 8:
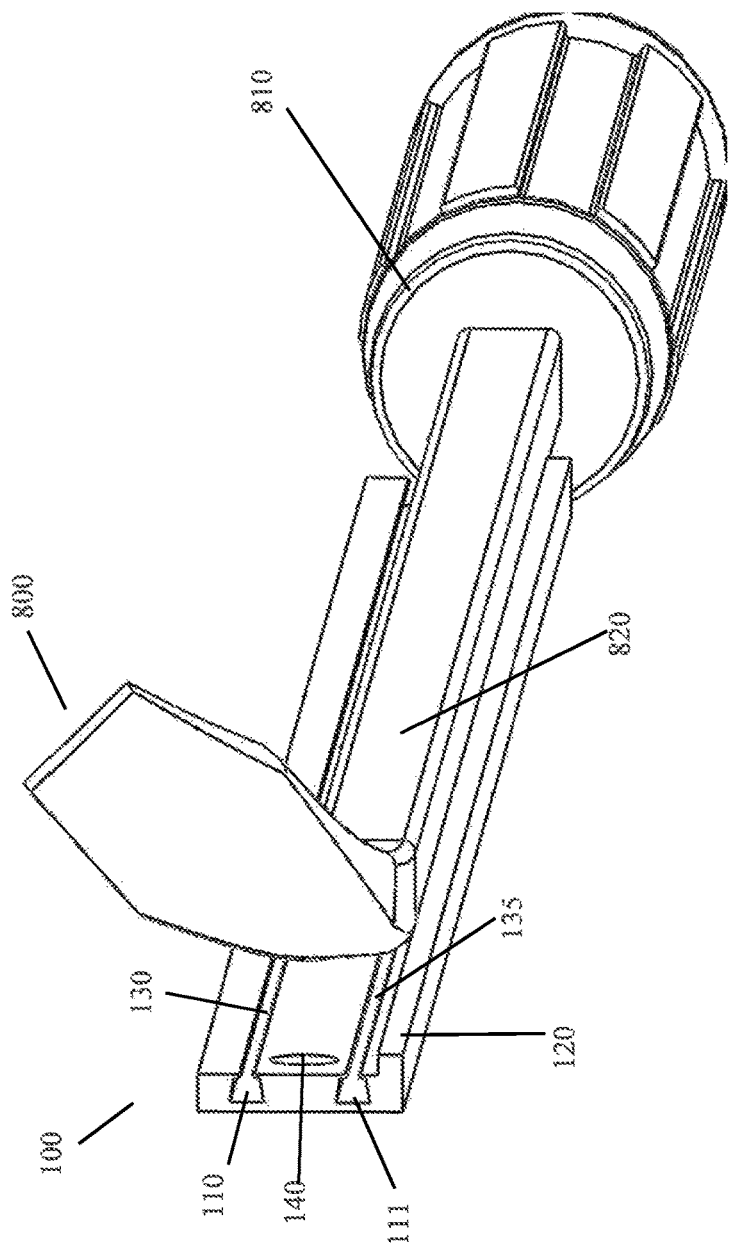
FIG. 8 shows the magnetic tool holder of FIG. 1 horizontally holding an example pry bar, according to an embodiment.

FIG. 8 shows the magnetic tool holder 100 that is horizontally holding an example pry bar 800, according to an embodiment. As shown, the example pry bar 800 includes a handle 810 and bar portion 820. The bar portion 820 is shown attached to the magnetic tool holder 100 second magnet 135 and at least partially by the first magnet 130 (or the magnetic force produced by the first magnet 130) and supported by the ledge 120. The handle 810 is shown overlapping an end of the magnetic tool holder 100. The placement of the pry bar 800 on the magnetic tool holder 100 provides the additional support that is required from, for example, a moving vehicle having the magnetic tool holder mounted therein. That is, when a moving vehicle is under forces from stopping quickly, the handle 810 would be forced against the end of the magnetic tool holder 100 and prevented from sliding on horizontally mounted magnetic tool holder 100. Additionally, the ledge 120 prevents the pry bar 800 from sliding down the magnetic tool holder 100 from the vehicle going over a bumpy road or, for example, a pot hole, or simply from the weight of a heavy tool, such as the pry bar 800.

Figure 9:
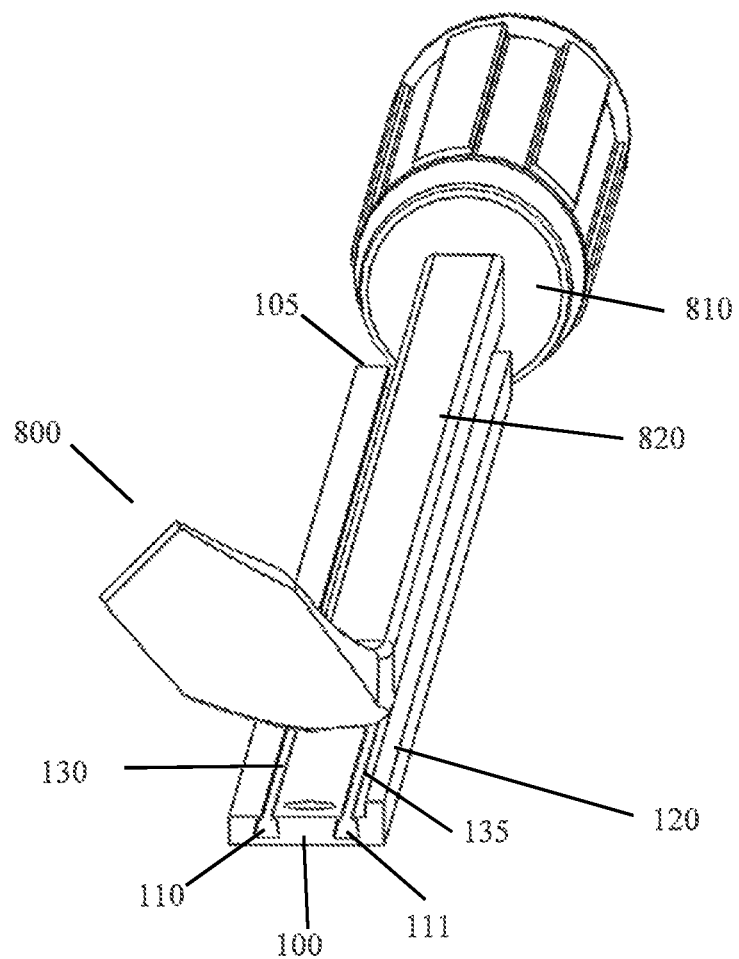
FIG. 9 shows the magnetic tool holder of FIG. 1 vertically holding an example pry bar, according to an embodiment.

FIG. 9 shows the magnetic tool holder 100 vertically holding the example pry bar 800, according to an embodiment. The bar portion 820 is shown attached to the magnetic tool holder 100 second magnet 135 and at least partially by the first magnet 130 (or the magnetic force produced by the first magnet 130) and supported against the ledge 120. The handle 810 is shown overlapping an end of the housing 105 of the magnetic tool holder 100. The placement of the pry bar 800 on the magnetic tool holder 100 provides the additional support that is required from, for example, a moving vehicle having the magnetic tool holder mounted therein. That is, when a moving vehicle is under forces from stopping quickly, the handle 810 would be forced against the end of the housing 105 of the magnetic tool holder 100 and prevented from sliding down on the vertically mounted magnetic tool holder 100. Additionally, the ledge 120 prevents the pry bar 800 from sliding backwards on the magnetic tool holder 100 from movement of the vehicle.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
  a body portion including:
    a top portion;
    a bottom portion;
    a first track;
    a ledge coupled to the bottom portion, wherein a height of the ledge is greater than a height of the body portion, and the ledge extends from the bottom portion a distance equal to a difference between the height of the ledge and the height of the body portion; and
    a first plurality of through-holes formed through both of a front side and a rear side of the body portion;
  a first magnet element disposed within the first track; and
  a spacer element coupled to the rear side of the body portion, the spacer portion including a second plurality of through-holes that are aligned with the first plurality of through-holes, the spacer element having a length and width equal to that of the body portion, the spacer element having a height equal throughout the length of the spacer element, and the spacer element having a height greater than the height of the ledge.

2. The apparatus of claim 1, further comprising:
  a second magnet disposed in a second track of the body portion;
  wherein a portion of the ledge that extends from the bottom portion has a width that is: greater than the difference between the height of the ledge and the height of the body portion, and less than the height of the body portion.

3. The apparatus of claim 2, wherein the first magnet and the second magnet are each neodymium magnets, and the width of the portion of the ledge that extends from the bottom portion has a distance of 0.12 inch.

4. The apparatus of claim 3, wherein the first track comprises an opening with a lower portion and an upper portion, the lower portion has a length greater than a length of the upper portion.

5. The apparatus of claim 1, wherein the first magnet has a length substantially equal to a length of the first track.

6. The apparatus of claim 1, wherein the ledge is integrated with the bottom portion, the ledge having a length at least equal to a length of the bottom portion.

7. The apparatus of claim 3, wherein the ledge prevents a tool coupled to the first magnet and the second magnet from sliding off of the first magnet and the second magnet.

8. The apparatus of claim 7, wherein the spacer element has a thickness greater than a thickness of the body portion.

9. The apparatus of claim 1, wherein the first magnet has a width larger than an upper opening of the first track.

10. The apparatus of claim 2, wherein each through-hole of the first plurality of through-holes are disposed between the first track and the second track.

11. A tool holder comprising:
  a body portion including:
    a bottom portion having a ledge, wherein a height of the ledge is greater than a height of the body portion, and the ledge extends from the bottom portion a distance equal to a difference between the height of the ledge and the height of the body portion;
    a first track;
    a second track; and
    a first plurality of through-holes formed through both of a front side and a rear side of the body portion; and
  a first magnet element disposed within the first track;
  a second magnet element disposed within the second track;
  a spacer element coupled to the rear side of the body portion, the spacer element including a second plurality of through-holes that are aligned with the first plurality of through-holes, the spacer element having a length and width equal to that of the body portion, the spacer element having a height equal throughout the length of the spacer element, and the height of the spacer element is greater than the height of the ledge; and a plurality of fasteners attaching the body portion with the spacer portion, the plurality of fasteners disposed through the first plurality of through-holes and into the second plurality of through-holes.

12. The tool holder of claim 11, wherein:

the first magnet and the second magnet are each neodymium magnets; and a portion of the ledge that extends from the bottom portion has a width that is: greater than the difference between the height of the ledge and the height of the body portion, and less than the height of the body portion.

13. The tool holder of claim 11, wherein the first track comprises an opening with a lower portion and an upper portion, the lower portion has a length greater than a length of the upper portion.

14. The tool holder of claim 11, wherein the first magnet has a length substantially equal to a length of the first track.

15. The tool holder of claim 11, wherein the ledge is molded as part of the bottom portion.

16. The tool holder of claim 11, wherein the spacer element has a thickness greater than a thickness of the body portion, and the ledge prevents a tool coupled to the first magnet and the second magnet from sliding off of the first magnet and the second magnet.

17. The tool holder of claim 11, wherein the first magnet has a width larger than an upper opening of the first track, and each through-hole of the first plurality of through-holes are disposed between the first track and the second track.

18. A tool holder comprising:

a body portion including:

a bottom portion having a ledge, wherein a height of the ledge is greater than a height of the body portion, and the ledge extends from the bottom portion a distance equal to a difference between the height of the ledge and the height of the body portion;

a first track;

a second track; and a first plurality of through-holes formed through both of a front side and a rear side of the body portion; and a first magnet element disposed within the first track;

a second magnet element disposed within the second track;

a spacer element removably coupled to a rear side of the body portion, the spacer element including a second plurality of through-holes that are aligned with the first plurality of through-holes, the spacer element having a length and width equal to that of the body portion, the spacer element having a height equal throughout the length of the spacer element, and the height of the spacer element is greater than the height of the ledge; and a plurality of fasteners attaching the body portion with the spacer portion, the plurality of fasteners disposed through the first plurality of through-holes and into the second plurality of through-holes.

19. The tool holder of claim 18, wherein:

the first magnet and the second magnet are each neodymium magnets;

the first track comprises an opening with a lower portion and an upper portion;

the lower portion has a length greater than a length of the upper portion;

the first magnet has a length substantially equal to a length of the first track; and a portion of the ledge that extends from the bottom portion has a width that is: greater than the difference between the height of the ledge and the height of the body portion, and less than the height of the body portion.

20. The tool holder of claim 18, wherein:

the ledge is molded as part of the bottom portion;

the spacer element has a thickness greater than a thickness of the body portion;

the first magnet has a width larger than an upper opening of the first track;

each through-hole of the first plurality of through-holes are disposed between the first track and the second track; and the ledge prevents a tool coupled to the first magnet and the second magnet from sliding off of the first magnet and the second magnet.

\* \* \* \* \*